US008949800B2

(12) United States Patent
Masser et al.

(10) Patent No.: US 8,949,800 B2
(45) Date of Patent: Feb. 3, 2015

(54) TIME-BASED TRACE FACILITY

(71) Applicant: International Business Machines Corporation, Armonk, NY (US)

(72) Inventors: Joel L. Masser, San Jose, CA (US); David Charles Reed, Tucson, AZ (US); Max Douglas Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 23 days.

(21) Appl. No.: 13/849,523

(22) Filed: Mar. 24, 2013

(65) Prior Publication Data
US 2013/0219371 A1 Aug. 22, 2013

Related U.S. Application Data

(63) Continuation of application No. 12/837,537, filed on Jul. 16, 2010, now Pat. No. 8,453,123.

(51) Int. Cl.
*G06F 9/44* (2006.01)
*G06F 11/36* (2006.01)
*G06F 11/34* (2006.01)

(52) U.S. Cl.
CPC ........ *G06F 11/3636* (2013.01); *G06F 11/3466* (2013.01)
USPC ............ 717/128; 717/124; 717/126; 717/131

(58) Field of Classification Search
CPC ............ G06F 9/44589; G06F 11/3688; G06F 11/3636; G06F 11/3466
See application file for complete search history.

(56) References Cited

U.S. PATENT DOCUMENTS

| 7,975,262 | B2 | 7/2011 | Cozmei | |
|---|---|---|---|---|
| 8,140,911 | B2 | 3/2012 | Borghetti et al. | |
| 8,141,051 | B2 | 3/2012 | Huang et al. | |
| 8,286,139 | B2 * | 10/2012 | Jones et al. | 717/128 |
| 8,302,080 | B2 * | 10/2012 | Wassermann et al. | 717/131 |

(Continued)

FOREIGN PATENT DOCUMENTS

JP 02122352 10/1990

OTHER PUBLICATIONS

Mihajlovic et al., Real-time address trace compression for emulated and real system-on-chip processor core debugging, May 2011, 6 pages.*

(Continued)

*Primary Examiner* — Thuy Dao
(74) *Attorney, Agent, or Firm* — Eric A. Gifford

(57) ABSTRACT

Method, system, and computer program product embodiments of a time-based trace facility for facilitating software debugging without interfering with the run-time behavior, performance or resource usage of the traced software are provided. The trace facility resides in a different address space than the target address space and uses different time-slices of CPU resources to execute the instructions in the address spaces. The trace facility uses a cross-memory mode to read the state data from the target address space in accordance with a time schedule. The trace facility writes the state data to a trace area, which may be located in either the target or trace address spaces or external storage. With this approach, the trace facility can read a large amount of state data frequently to construct the type of historical record needed to analysis run-time behavior, performance and resource usage.

17 Claims, 9 Drawing Sheets

(56) References Cited

U.S. PATENT DOCUMENTS

| | | | |
|---|---|---|---|
| 8,307,344 | B2 | 11/2012 | Laurenti et al. |
| 8,312,435 | B2 | 11/2012 | Wygodny et al. |
| 8,336,033 | B2 | 12/2012 | Schmelter et al. |
| 8,527,958 | B2 * | 9/2013 | Sohm et al. ............ 717/128 |
| 8,707,272 | B2 * | 4/2014 | Ganai .................... 717/126 |
| 8,726,240 | B2 * | 5/2014 | Gallagher et al. ...... 717/124 |
| 2001/0014958 | A1 | 8/2001 | Yamauchi et al. |
| 2004/0205723 | A1 | 10/2004 | Juan et al. |
| 2007/0006173 | A1 | 1/2007 | Sohm et al. |
| 2008/0091369 | A1 | 4/2008 | Levine et al. |
| 2008/0209402 | A1 | 8/2008 | Parkinson |
| 2010/0107145 | A1 | 4/2010 | Warren et al. |
| 2010/0333071 | A1 | 12/2010 | Kuiper et al. |
| 2011/0138363 | A1 | 6/2011 | Schmelter et al. |
| 2013/0318506 | A1 * | 11/2013 | Sohm et al. ............ 717/128 |

OTHER PUBLICATIONS

Kao et al., A Hardware Approach to Real-Time Program Trace Compression for Embedded Processors, 2007, 14 pages.*

Zhai et al., FACT: fast communication trace collection for parallel applications through program slicing, 2009, 12 pages.*

Jintao et al., "Analysis of test case error discover ability on fuzzy logic," Computer Engineering. vol. 33, No. 9, May 2007.

Schenker et al., "The application of fuzzy enhanced case-based reasoning for identifying fault-prone modules," retrieved online Apr. 7, 2010.

Jin-Chern Lin et al., "Fuzzy control chart for software defects management," IMECS 2006, pp. 86-91.

Wang et al., Dynamic slicing on java bitecode traces, Mar. 2008, 49 pages.

Yilmaz et al., "An automated model-based debugging approach," Nov. 2010, 10 pages.

Zhai et al., "FACT:fast communication trace collection for parallel applications through program slicing," Nov. 2009. 12 pages.

IBM Corporation, Supervisor diagnosis reference, Jul. 2007, 578 pages.

* cited by examiner

PARAMETER
FILE 222

| | |
|---|---|
| TARGET ADDRESS SPACE: | XYZ |
| TARGET PROCESSING TASK: | CATALOG |
| TRACE MODULE | LMO |
| DSN | Q1.Q2.Q3 |
| BLOCKS | RPL,DCB |
| FREQUENCY | 5 ms |
| STORAGE ATTRIBUTES | ABC |
| STORAGE SIZE | 256 MEGA BYTES |

FIG.3

HISTORICAL RECORD 400

| | | |
|---|---|---|
| RPL [DATA] | 0123456 | 12.01.30.123456 |
| DCB [DATA] | 00112222 | 12.01.30.123456 |
| RPL [DATA] | 0123456 | 12.01.30.128500 |
| DCB [DATA] | 00112222 | 12.01.30.128500 |

FIG.4

TIME-BASED TRACE FACILITY

CROSS REFERENCE TO RELATED APPLICATIONS

This application is a continuation and claims benefit under 35 U.S.C. Section 120 of the following co-pending and commonly-assigned U.S. Utility Patent Application, which is incorporated by reference herein: U.S. patent application Ser. No. 12/837,537, filed on Jul. 16, 2010, entitled, "Time-Based Trace Facility."

FIELD OF THE INVENTION

The present invention relates to the field of software monitoring and tracing, and more specifically, to a time-based trace facility for recording state data to build an historical record for software in a computer environment.

DESCRIPTION OF THE RELATED ART

Users of computing applications often encounter various sorts of problems and inconsistencies while using the applications. Designing computer software that will minimize user problems requires knowledge as to how the user is making use of the application and the tasks that are trying to be accomplished by use of the applications. The design process typically includes iterative design and user testing of those designs in order to identify where users have problems so that design flaws can be accurately addressed and fixed. A thorough knowledge of problems that users encounter in existing products is also critical if design mistakes are to be avoided for future versions of those applications.

Understanding what is important to users of a particular software application product is a challenge for software application developers. Typically, enhancements to a product release are based on feedback from surveys, forums or from user design center sessions in which participants are given a set of tasks to accomplish while using the application. Some problems inherent in these methods, however, include the inability of users to articulate their needs, the artificiality of surveys produces feedback that is not meaningful, and users of forums are typically technical fans of the product so that the results may be of little practical use to the product developers.

Most would agree that the best way to get feedback is by observing what a user does throughout actual use sessions with the product, that is by watching the user as the user works through the application in the setting for which it was intended. The problem is to provide a meaningful solution for gathering real user feedback in real time on a regular basis, and providing this data back to the program developer where it can be analyzed and used in enhancing and improving the application. One effective way of gathering such information about user interaction with the application is through code instrumentation. The term "instrumentation" is understood to mean the incorporation of statements or routines in an application to cause outputs to be provided when the application is running on a computer system thereby illustrating the interaction of the end user with the application. These outputs may be displayed in real-time, which is referred to as "monitoring", or recorded to memory to form an historical record, which is referred to as "tracing".

Within the computer system the applications run in address space. An address space is a range of contiguous virtual storage addresses that the system creates for a user. Contiguous virtual storage addresses are mapped into real addresses in real memory (e.g. RAM), which may not be contiguous. The address space contains system and application executable code, application user data and application and system state data. Application instructions execute in an address space.

Currently, it is known that instrumenting an application involves going into the application and adding appropriate program code at every point in the application where useful user data can be gathered, and then recompiling the application. This is referred to as "event-based" or "location-based" monitoring or tracing. The monitor/trace function is placed in a specified location within the application and the function is triggered when the application's execution reaches that location.

It has been found that this "compile-time" method of instrumentation is not really effective for a number of reasons. It takes many points of instrumentation to get sufficient and meaningful overall coverage of user interaction with the application. At the particular code level, it is difficult to be judicious in selecting code points for instrumentation. A large number of instrumentation points can negatively affect the application's performance. The amount of data produced depends entirely on where the user is spending time in working with the application. In some instances, the data can be large and therefore cumbersome to analyze, and at other times, it may be sparse and therefore of very little practical use.

To address the limitations of "compile-time" instrumentation it is suggested to dynamically insert a time-based monitor function into an address space of a running application. This is done a run-time, hence does not require recompilation. The time-based monitor function is triggered at a preset time interval, regardless of where the application execution is at that moment, with each invocation generating an updated display in the output window of the current state of one or more monitored global variables. Because data capture is asynchronous with the process events, the data may not reflect the exact state when a critical event occurs. Once monitoring is completed the monitor function is removed.

BRIEF SUMMARY

In view of the foregoing, various method, system, and computer program product embodiments of a time-based trace facility for facilitating software debugging without interfering with the run-time behavior, performance or resource usage of the traced software are provided.

According to one embodiment of the present invention, in a computer system in which the OS (such as IBM's z/OS) and one or more CPUs support one or more cross-memory modes a time-based trace facility implemented in a trace address space reads state data from a different target address space for a processing task according to a time-based schedule and writes the state data to a trace area. The schedule may specify a finite time interval or may specify continuous read out. The trace area may be located in the target or trace address spaces, a data space, or in external storage. The one or more CPUs allocate a time slice of CPU resources to the target address space to run the processing task executable code to update the state data and allocate a different time slice of CPU resources to the trace address space to run the trace facility executable code to read state data from the target address space using the cross-memory mode. Because the trace facility resides in a different address space, the executable code does not interfere with run-time behavior, performance or resource usage of the processing task. This approach allows a large amount of state data to be saved frequently to enable problem determination without interfering with the operation of the processing task.

The time-based trace facility may be provided with a parameter file that specifies one or more parameters to configure the trace facility. The parameter file may specify one or more of the following: target address space, traced processing tasks within the target address space, name of a trace facility module to call, filters to specify what state date to trace, continuous tracing or the time interval, amount of memory to store the trace, error detection criteria, actions to be taken upon error detection and any exit modules.

The time-based trace facility may comprise an interface for communication with processing tasks being traced. The processing task may notify the trace facility than error has occurred, indicating that the historical record of state data needs to be offloaded to permanent storage. Alternately, the trace facility may monitor the state data to detect errors and can notify the traced processing task that an error has been detected. The trace facility may be configured to implement some measure of remediation based on the detected error.

The trace facility may be implemented as part of a test program for internal product testing or providing client services. The trace facility may be provided as an integrated part of an application or middle-ware product or as a stand-alone component of an operating system.

The trace facility may be implemented to trace state data from a single processing task within a target address space, multiple processing tasks within the same target address space or multiple processing tasks in different address spaces. The trace facility may be cloned and configured via different parameter files to trace state data from different processing tasks.

Related system and computer program product embodiments are also disclosed and provide additional advantages.

BRIEF DESCRIPTION OF THE SEVERAL VIEWS OF THE DRAWINGS

In order that the advantages of the invention will be readily understood, a more particular description of the invention briefly described above will be rendered by reference to specific embodiments that are illustrated in the appended drawings. Understanding that these drawings depict only embodiments of the invention and are not therefore to be considered to be limiting of its scope, the invention will be described and explained with additional specificity and detail through the use of the accompanying drawings, in which:

FIG. 3 depicts an embodiment of a parameter file for use with the time-based trace facility;

FIG. 4 depicts an embodiment of an output file of state data read out of the target address space;

DETAILED DESCRIPTION

Figure 1:
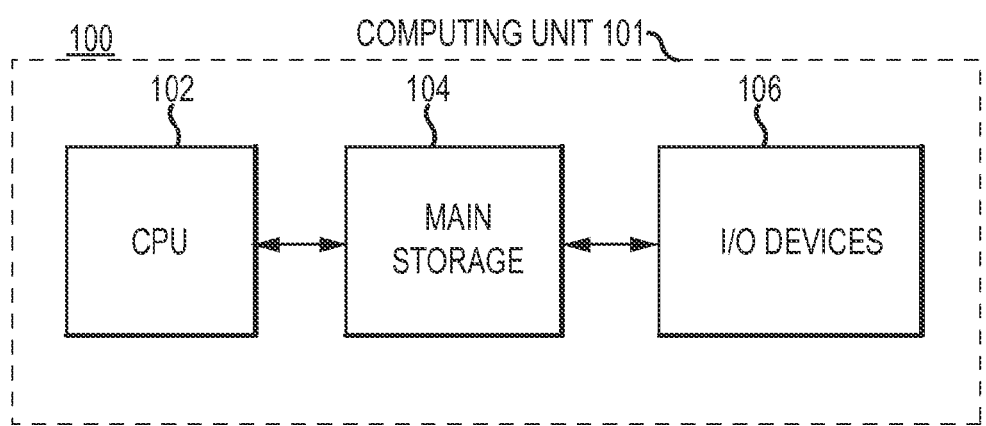
FIG. 1 depicts an embodiment of a computing environment that supports cross-memory mode to employ a time-based trace facility in accordance with the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

There are many reasons to trace a running application, process, job or other software task, referred to throughout generically as "processing tasks". To name a few: (1) to understand the task's run-time behavior including the occurrence of any errors; (2) to ensure that the task achieves an expected performance; and (3) to monitor the task's system resource usage, e.g., memory usage. The trace operation can be further divided into two categories: (1) location- or event-based monitoring; or (2) time interval-based monitoring, where a trace facility is triggered at a preset time interval, regardless of where the task execution is at that moment. There are many tools that support location-based tracing. In contrast, there are few tools that support time-based monitoring or tracing.

The use of current known location and time-based monitoring tools affects the monitored or traced processing task. In location-based tools, appropriate program code is added in the address space at every point in the processing task where useful user data can be gathered. In the existing time-based tools, the monitor function is inserted into address space of the running processing task. Therefore the instructions executed in the address space include the instructions for the monitor/trace function.

In a computer system, one or more central processing units (CPUs) are controlled to allocate "time slices" of CPU resources to execute the instructions for different address spaces. Because the allocated resources for a given address space must also be used to execute the instructions for the monitor/trace function the function will affect the processing task. For example, the instructions are stored in memory and thus affect resource usage. Execution of the instructions uses CPU resources and thus reduces performance (i.e. speed). In cases where the amount of data output to the display or storage is large, the I/O of the trace/monitor function may be so significant as to interfere with the running of the traced processing task. In many computing environments, customers cannot tolerate such a reduction in throughput. Finally, insertion of the program code at compile-time or the monitor function at run-time affects the relative timing of the execution of different instructions within the address space, which may cause errors to occur that otherwise would not occur or may mask errors in the underlying processing from occurring. Furthermore an error in the program code or monitor function can cause the target access space to crash.

In contrast, presented herein, is a time-based trace facility that does not interfere with run-time behavior, performance or resource usage of the traced processing task. The trace facility resides in a different address space than the target address space and uses a different time-slice of CPU resources to execute the instructions in its address space. The trace facility uses a cross-memory mode to read the state data from the target address space in accordance with a time schedule (e.g. a specified time-interval or continuously). The trace facility writes the state data to a trace area, which may be located in either the target or trace address spaces, a data space, or external storage. With this approach, the trace facility can read a large amount of state data frequently to construct the type of historical record needed to analyze run-time behavior, performance and resource usage. The trace facility may use a parameter file to configure a particular trace e.g. specify the target address space, one or more processing tasks within the target address space, a specific trace module, filters to extract specific state data, the time interval, the trace area, etc.

One example of a computing environment incorporating and using a trace facility in accordance with the present invention is depicted in FIG. 1 and described below.

Referring to FIG. 1, a computer environment 100 includes, for instance, a computing unit 101 having at least one central processing unit 102, a main storage 104 and one or more input/output devices 106, each of which is described below.

As is known, central processing unit 102 is the controlling center of computing unit 101 and provides the sequencing and processing facilities for instruction execution, interruption action, timing functions, initial program loading and other machine related functions. The central processing unit 102 allocate time-slices of CPU resources to different address spaces to execute instructions to run, for example, the processing tasks in one or more target address spaces and the trace facility in one or more trace address spaces. The central processing unit executes at least one operating system (OS) such as z/OS, which as known, is used to control the operation of the computing unit by controlling the execution of other programs, controlling communication with peripheral devices and controlling use of the computer resources.

Central processing unit 102 is coupled to main storage 104, which is directly addressable and provides for high speed processing of data by the central processing unit. Main storage may be either physically integrated with the CPU or constructed in stand alone units.

Main storage 104 is also coupled to one or more input/output devices 106. These devices include, for instance, keyboards, communications controllers, teleprocessing devices, printers, magnetic storage media (e.g., tape, disks), direct access storage devices, and sensor based equipment. Data is transferred from main storage 104 to input/output devices 106, and from the input/output devices back to main storage.

One of the strengths of z/OS (and other suitable operating systems) is the concept of address spaces. Every process (or address space) has its own storage, and believes it has the entire z/OS to itself. Separating tasks into address spaces means that a task in one address space cannot access data or affect (e.g. crash) a task in another. However there are times when a task in one address space needs to access data, or even run a program, in another address space. Therefore the OS and hardware may be configured to support what is referred to as "cross-memory mode" that enables a task in one address space to read data from or run a program in another address space. In general, a task makes a request to the OS to authorize use of cross-memory mode to interact with a different address space. If authorized, the OS provides the task with a "token" that is loaded to enable cross-memory mode between the requesting and target address spaces.

In z/OS address space control (ASC) mode tells the system where to find the data it is to reference. The mode is given by a program status word (PSW) that contains the current address pointer. In z/OS, the PSW can specify one of four modes, one that is private and three that are different versions of a cross-memory mode. A primary mode exists when the current primary address space (PASN) and the current home address space (HASN) are different address spaces. A secondary mode exists when the current secondary address space (SASN) and the current home address space (HASN) are different address spaces. An AR (access register) mode exists when the system uses both the general purpose register (GPR), used as the base register, and the corresponding AR to resolve an address in an address/data space.

In one example, computer environment 300 is a single system environment, which includes an IBM System z10 Enterprise Class computer system running a z/OS operating system. (z10 Enterprise Class and z/OS are offered by International Business Machines Corporation, Armonk, N.Y.). The invention is not limited to such an environment, however. The capabilities of the present invention can be incorporated and used within many types of computer environments and many types of computer systems as long as the system supports "common-memory mode" or an equivalent. For instance, computer environment 100 can include a UNIX workstation running a UNIX-based operating system. Other variations are also possible and are considered a part of the claimed invention.

Figure 2:
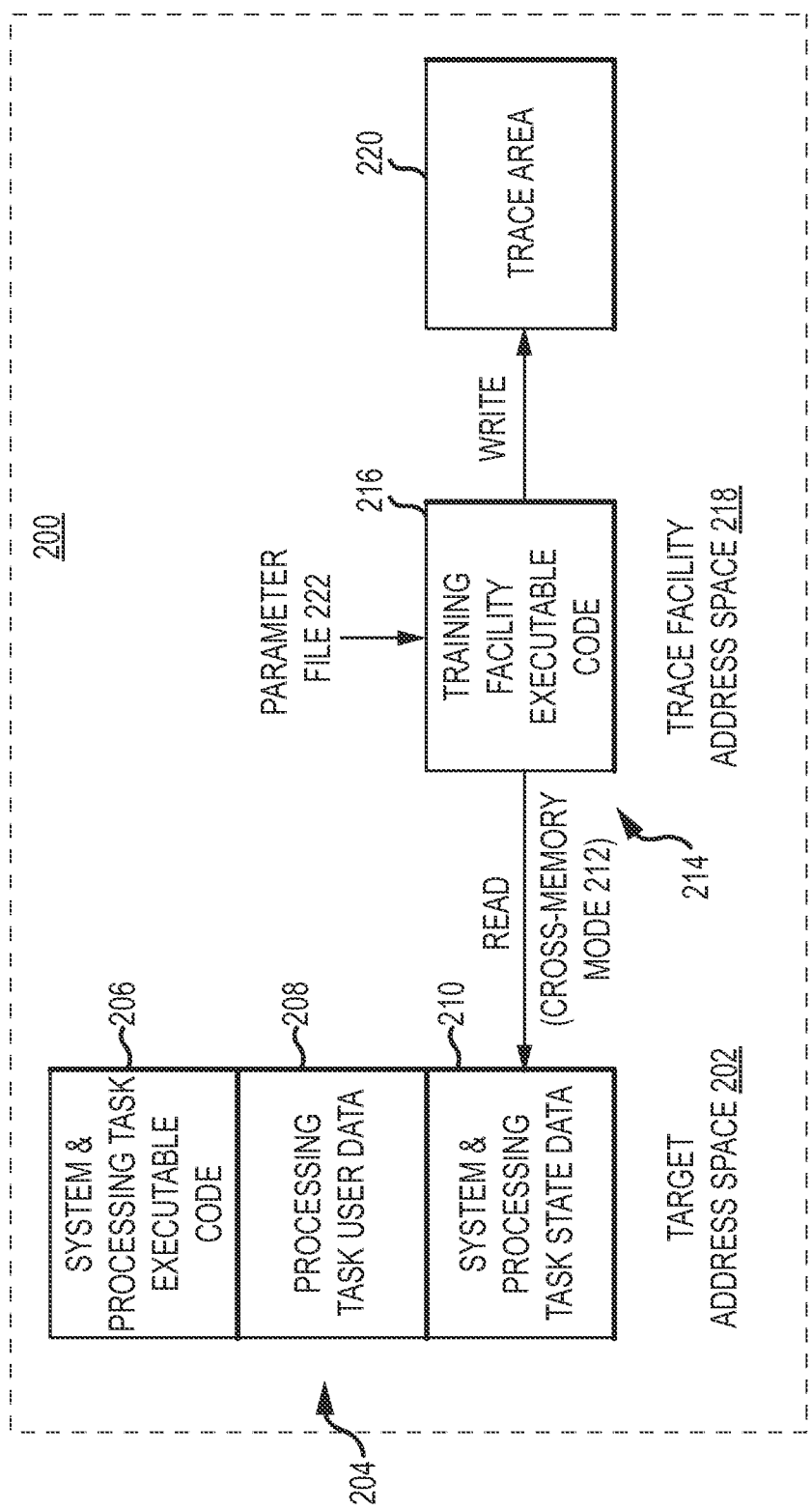
FIG. 2 depicts an embodiment of a time-based trace facility that traces a processing task in a separate target address space using the system's cross-memory mode to read state data in the target address space.

FIG. 2 depicts an embodiment of a time-based trace facility that utilizes the computer system's cross-memory mode to read state-data for a target processing task according to a time-based schedule and writes the state-data to a trace area. The computer system comprises memory 200 (e.g. main storage or RAM), a target address space 202 in memory 200 and a target processing 204 comprising system and processing task executable code 206, processing task user data 208 and system and processing task state data 210 in target address space 202. The computer system and OS support one or more cross-memory modes 212. A time-based trace facility 214 comprises tracing facility executable code 216 in a trace address space 218. The trace facility and target processing task reside in different address spaces. The computer system's one or more CPUs allocate a time slice of CPU resources to the target address space 202 to run the processing task executable code 206 to update the state data 210 and a different time slice of CPU resources to the trace address space 218 to run the trace facility executable code 216 using the cross-memory mode 212 to read state data 210 from the target address space 202 and write the state data to a trace area 220 on a time-based schedule to store a historical record of state data at multiple time instances. The trace area may be located in the target or trace address spaces or in external storage.

The time-based trace facility may comprise an interface for communication with processing tasks being traced. The processing task may notify the trace facility than error has occurred, indicating that the historical record of state data needs to be offloaded to permanent storage. Alternately, the trace facility may monitor the state data to detect errors and can notify the traced processing task that an error has been detected. The trace facility may be configured to implement some measure of remediation based on the detected error.

The trace facility may be implemented as part of a test program for internal product testing or providing client services. The trace facility may be provided as an integrated part of an application or middle-ware product or as a stand-alone component of an operating system.

The trace facility may be implemented to trace state data from a single processing task within a target address space, multiple processing tasks within the same target address space or multiple processing tasks in different address spaces. The trace facility may be cloned and configured via different parameter files to trace state data from different processing tasks.

The time-based trace facility may be provided with a parameter file 222 that specifies one or more parameters to configure the trace facility. As shown in an embodiment, parameter file 222 may specify one or more of the following: target address space, traced processing task within the target address space, name of a trace module to call (different trace modules may be needed if the sets of state data are different), filters to specify what state date to trace (e.g. DSN specifies particular data sets and Blocks specifies particular state data structures), continuous tracing or the time interval, where trace area resides (e.g. storage attributes), amount of memory to store the trace, error detection criteria, actions to be taken upon error detection and any exit modules. Alternately, the trace facility could be hard-coded to implement a specific trace.

FIG. 4 depicts an example of a historical record 400 generated by the time-based trace facility. Record 400 includes the block name (e.g. RPL or DCB), block address, rime stamp of tracing pass and the copied state data. The trace facility reads the state data using the cross-memory mode and then writes the data to the trace area according to the time schedule (e.g. every 5 ms). Typically, the facility writes the state data for a certain period or total size into the trace area and the overwrites the trace data. For example, the trace facility may read and write state date every 5 ms for 5 min. and then over-write the trace area. If the processing task or trace facility detects an error or some other exit condition, the trace facility may download the current contents of the trace area to another location such as permanent storage for analysis.

Figure 5:
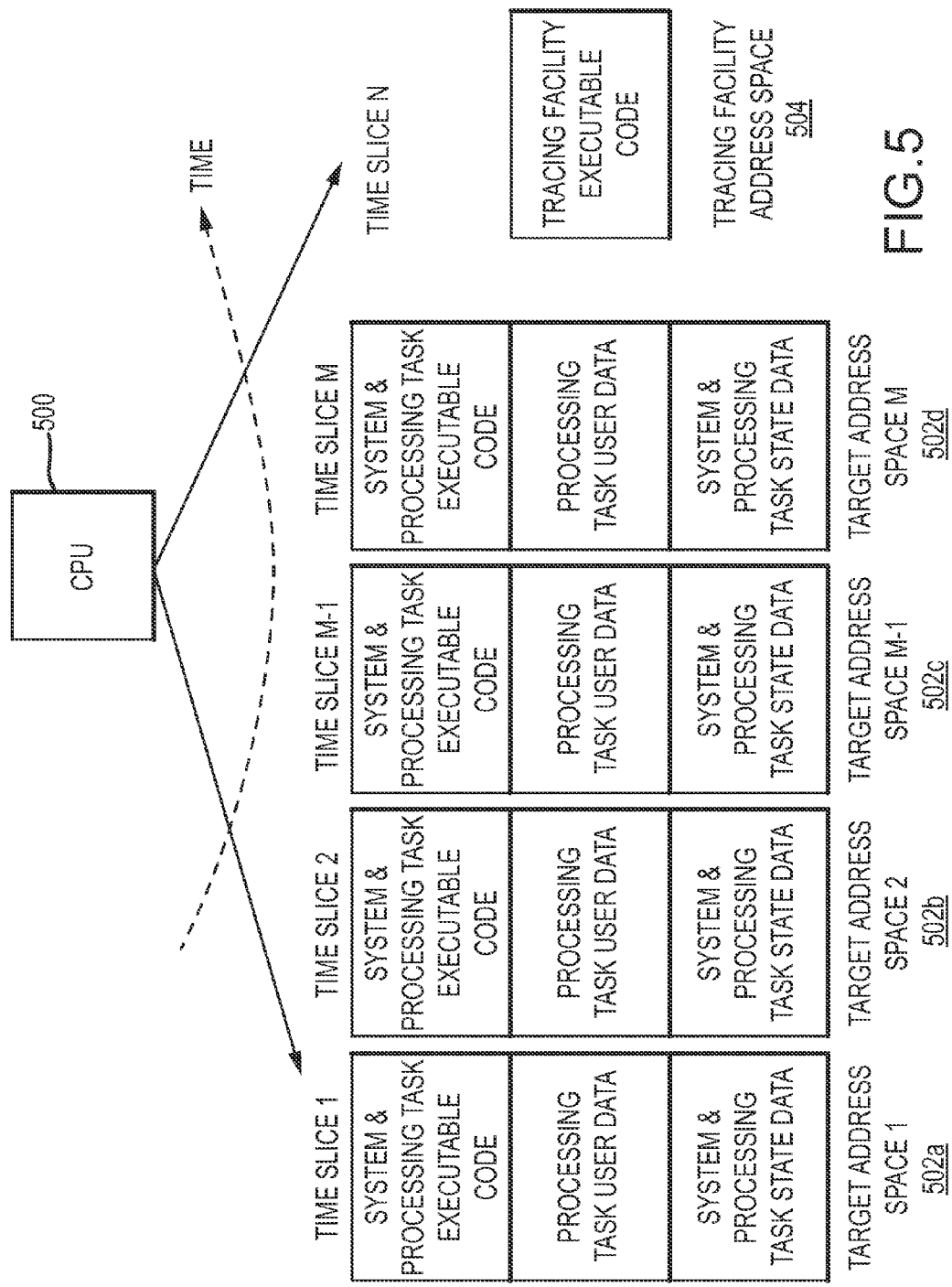
FIG. 5 depicts an embodiment of a computer system in which one or more CPUs allocate different time-slices to execute the target and trace address spaces.

FIG. 5 depicts one or more CPUs 500 that allocate a time slice 1, 2, . . . M−1, M . . . of CPU resources to different target address spaces 502a, 502b, 502c and 502d to run their respective processing task executable code to update the state data and allocate a different time slice N of CPU resources to the trace address space 504 to run the trace facility executable code to read state data from the target address space using the cross-memory mode. The one or more CPUs can move to the next address space when the current time slice ends, is interrupted or the target address spaces gives up control. Because the trace facility resides in a different address space, the executable code does not interfere with run-time behavior, performance or resource usage of the processing task. This approach allows a large amount of state data to be saved frequently to enable problem determination without interfering with the operation of the processing task. A single trace facility could serially service multiple target address spaces. The single trace facility may be reconfigured based on different input files for each target address space. Alternately, the trace facility could be cloned so that each facility services one target address space.

Figure 6:
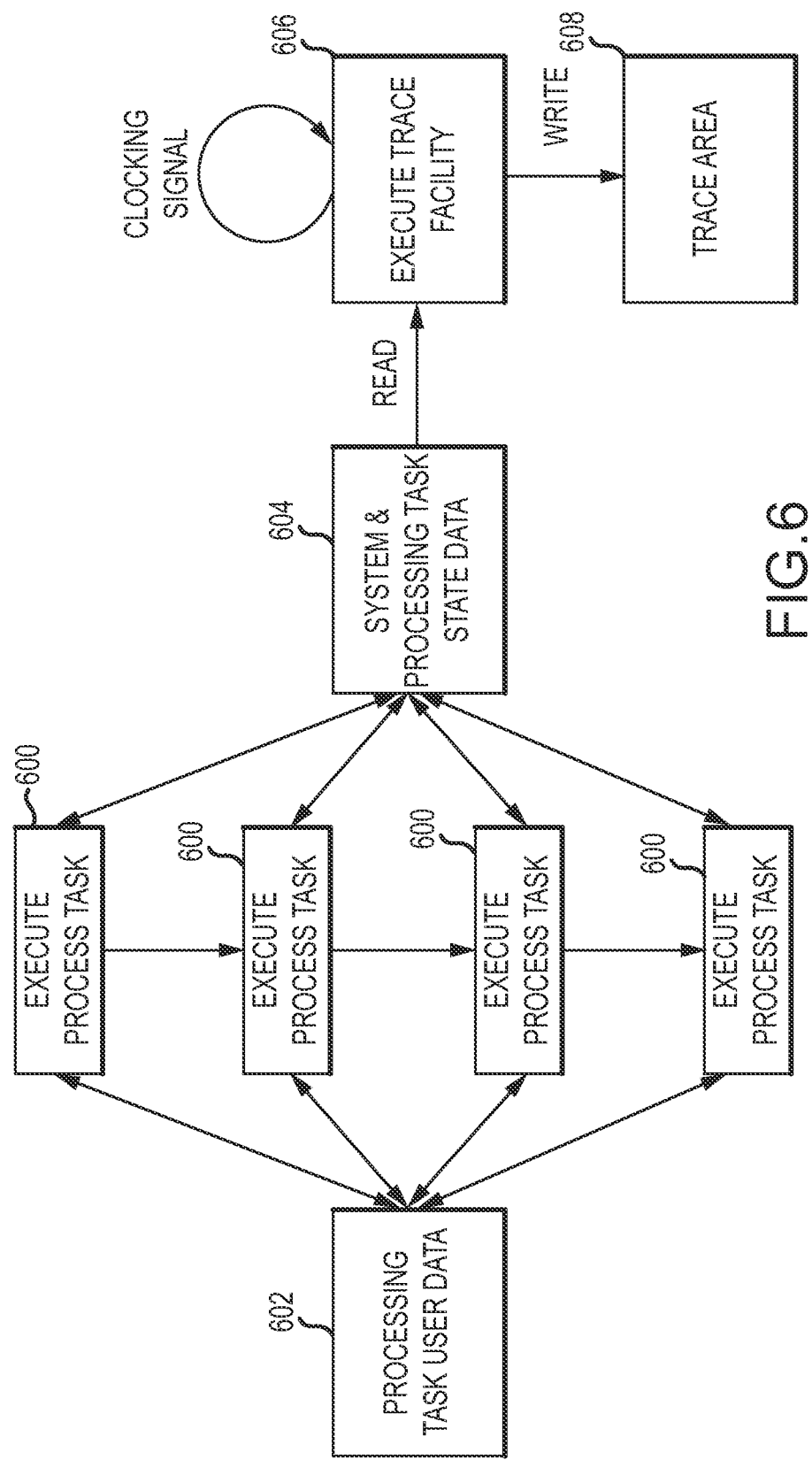
FIG. 6 depicts an embodiment of the target process flow and asynchronous time-base tracing of the process' state data.

FIG. 6 is a flow diagram depicting the complete transparency of the asynchronous time-based trace facility to the target address space and processing task. The processing task 600 executes at each successive time slice until the time slice ends, is interrupted or the task voluntarily gives up control. The processing task reads/writes user data 602 and state data 604. The trace facility 606 executes at its assigned time slice and in accordance with the time schedule and a clocking signal to read state data 604 and write the state data to trace area 608. The frequency of the time slices is typically sufficiently high that a time slice is allocated to the trace facility at or very close to the specified time interval. If the trace facility is configured to trace continuously than the trace facility executes at each successive time slice. The processing task executes without any interference from the trace facility, state data is used and updates as no trace is being performed. The trace facility does not consume any portion of the time slice resources dedicated to the target address space and is not serialized with the processing task, and thus does not degrade performance. The customer can continue to use his computer system, processing and other tasks as if the trace facility was not present. In large consumer based systems that operate 24/7, the systems cannot be taken offline or their performance degraded to run traces that build a historical record of sufficient state data and time history to analyze run-time behavior including debugging errors. The capability of the time-based trace facility to build such a historical record without interfering with the real-time operation of the computer system is important.

Figure 7:
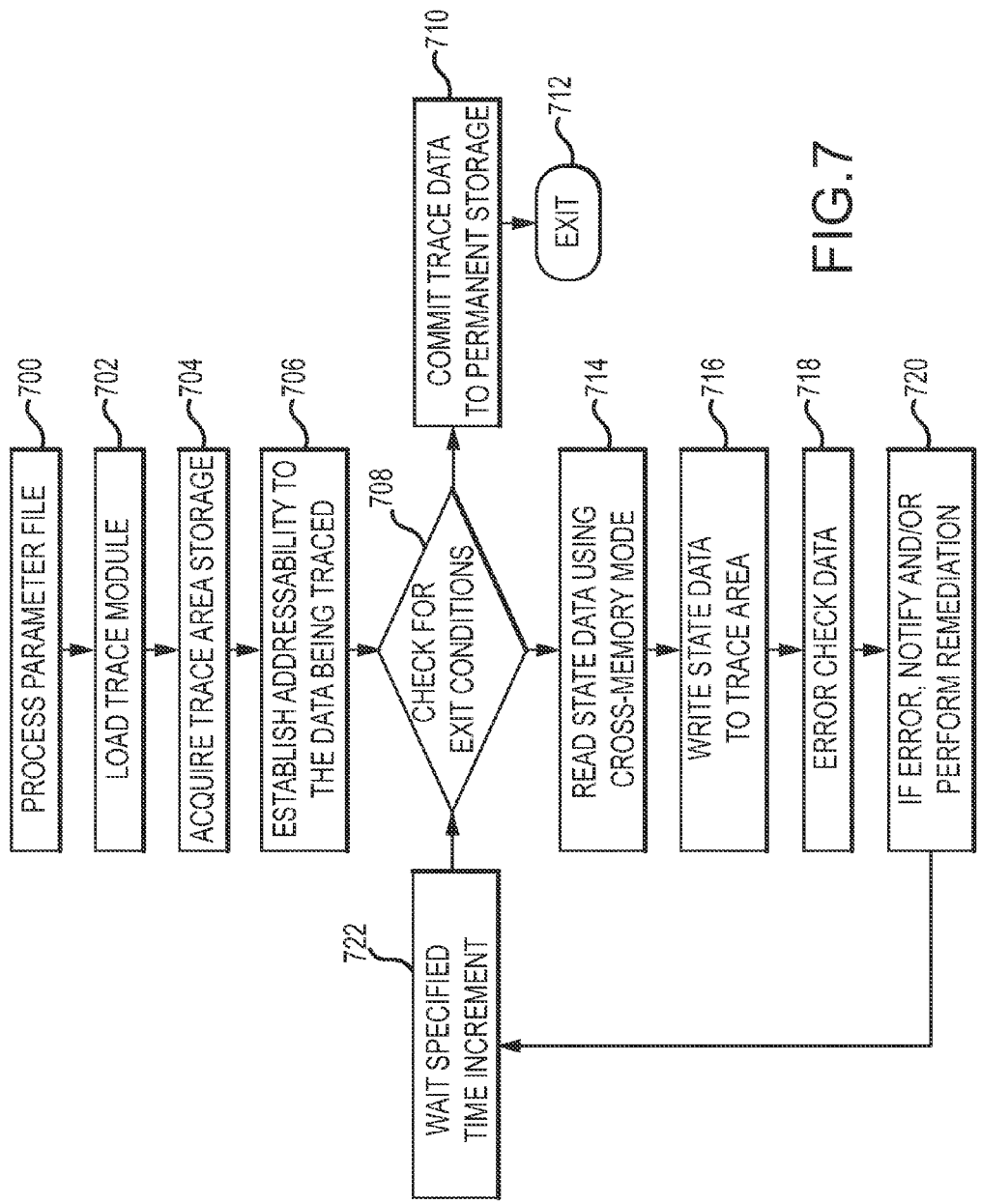
FIG. 7 depicts an embodiment of a flow diagram of the time-based trace facility.

FIG. 7 is a process flow diagram of an embodiment of a time-based trace facility. The one or more CPUs execute the instructions for the trace facility executable code. The trace facility processes the parameter file including the target address space, target processing tasks, state data to be traced, the trace module, the location and amount of storage to acquire etc. (step 700). The trace facility loads the specified trace module (step 702). The facility acquires trace area storage in the trace address space, in one or more data spaces, in a log stream, in the address space being traced, or directly on permanent storage (step 704). The facility establishes addressability to the data being traced (step 706). This is typically done by requesting a cross-memory mode from the operating system and being granted a token that grants authorization for the requesting trace address space to read state data from a target address space. The facility checks for exit conditions (step 708) such as a notification to stop tracing or a notification to offload data. If so, the facility commits the trace data to permanent storage as needed (step 710) and exits (step 712). Otherwise the facility reads the state data being traced using one of the supported cross-memory modes (step 714) and writes the state data to the trace area (step 716). Typically, a complete set of state data is saved, comparable to the state data in a memory dump taken after a problem has occurred. The saved copies of state data provide a baseline for comparison with the state after a problem has been detected. In addition, the state data provides a historical record showing state changes over time. The read/write operations are performed by a separate dedicated process (the trace facility), and thus do not impose any delay or overhead in the process(es) being traced. During the read/write operations, the system and all processing tasks continue processing without regard to the trace. The trace facility may error check the current data set, if provided for in the facility and/or specified, in the parameter file (step 718). This is an option to performing error detection in the processing task itself. If an error is detected, the trace facility may perform any specified remediation or notification (step 720) and may commit the trace data to permanent storage (step 710) and exit (step 712). Otherwise the trace facility waits the specified time increment (step 722) and repeats steps 708 through 720.

As described, the traced state data is written to a trace area for temporary storage until the data is offloaded to permanent storage. This trace area may reside in the trace address space, in one or more data spaces, in a log stream, in the target address space, or directly on permanent storage.

Figure 8:
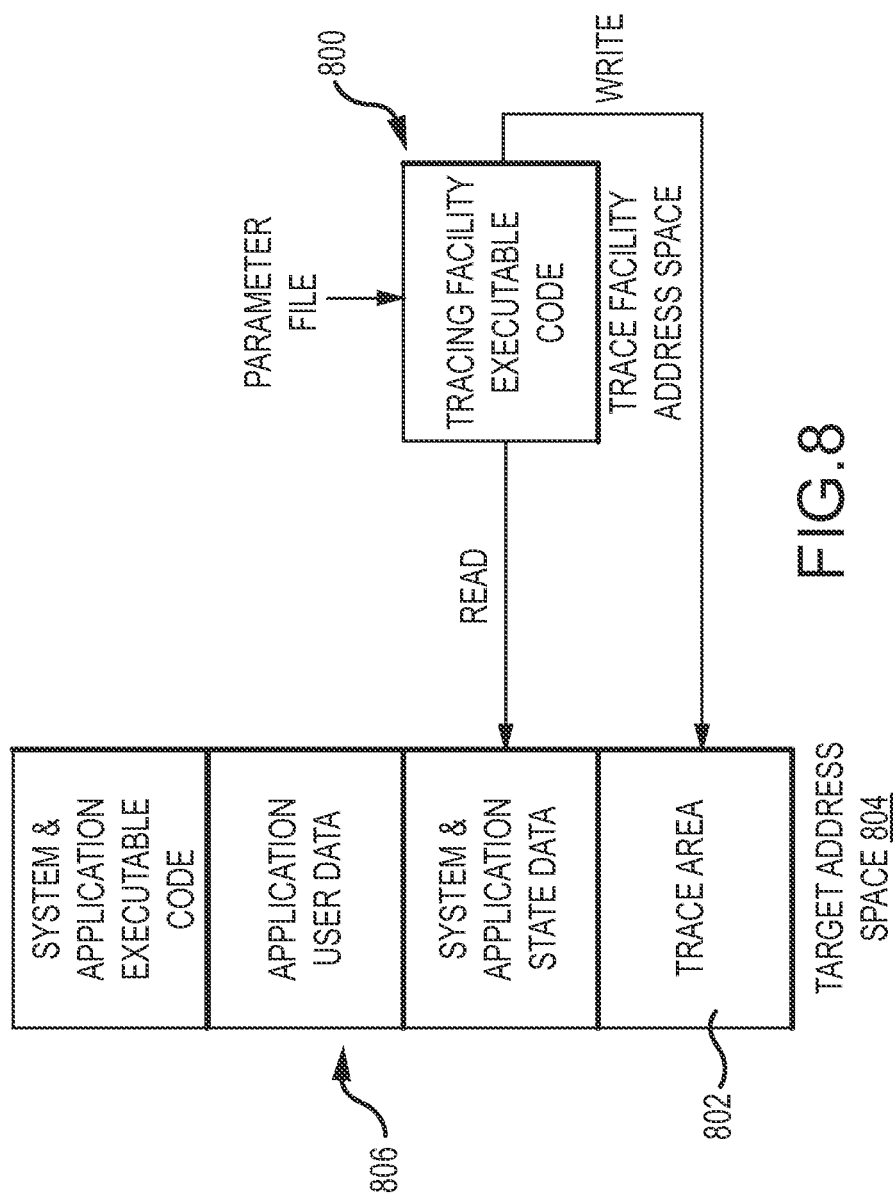
FIG. 8 depicts an embodiment in which the trace area to which the state data is written is part of the target address space.

FIG. 8 depicts an embodiment of a trace facility 800 in which the trace area 802 resides in the target address space 804 for the target processing task 806. Even though storage is acquired in the target address space, no instruction execution occurs in the target address space, so an error in the trace facility will not impact the target space. An advantage of locating the trace area 802 in the target address space 804 is that if an error occurs during execution of the processing task a memory dump occurs to permanent storage saving a snapshot of the entire target address space including the trace area. The trace facility is not required to recognize the occurrence of the error and download the trace area.

Figure 9:
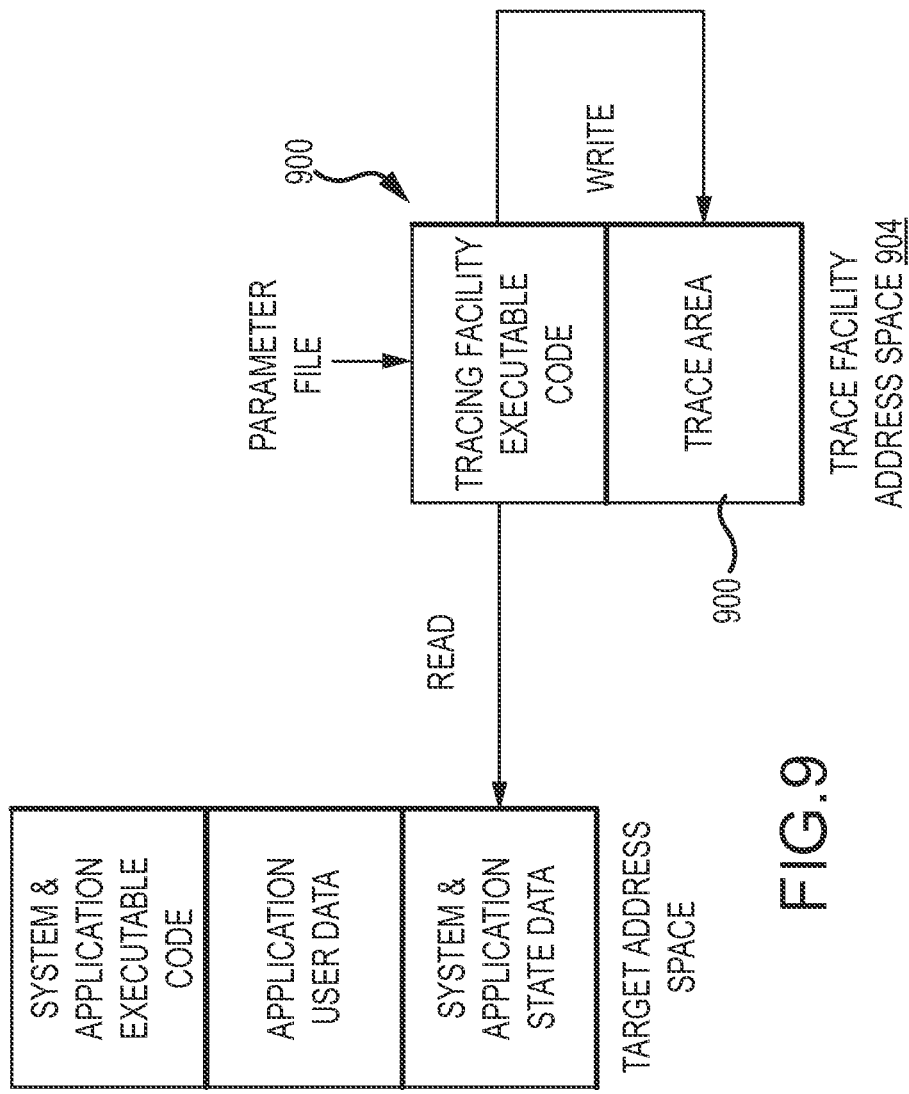
FIG. 9 depicts an embodiment in which the trace area to which the state data is written is part of the trace address space.

FIG. 9 depicts an embodiment of a trace facility 900 in which the trace area 902 resides in the trace address space 904.

Figure 10:
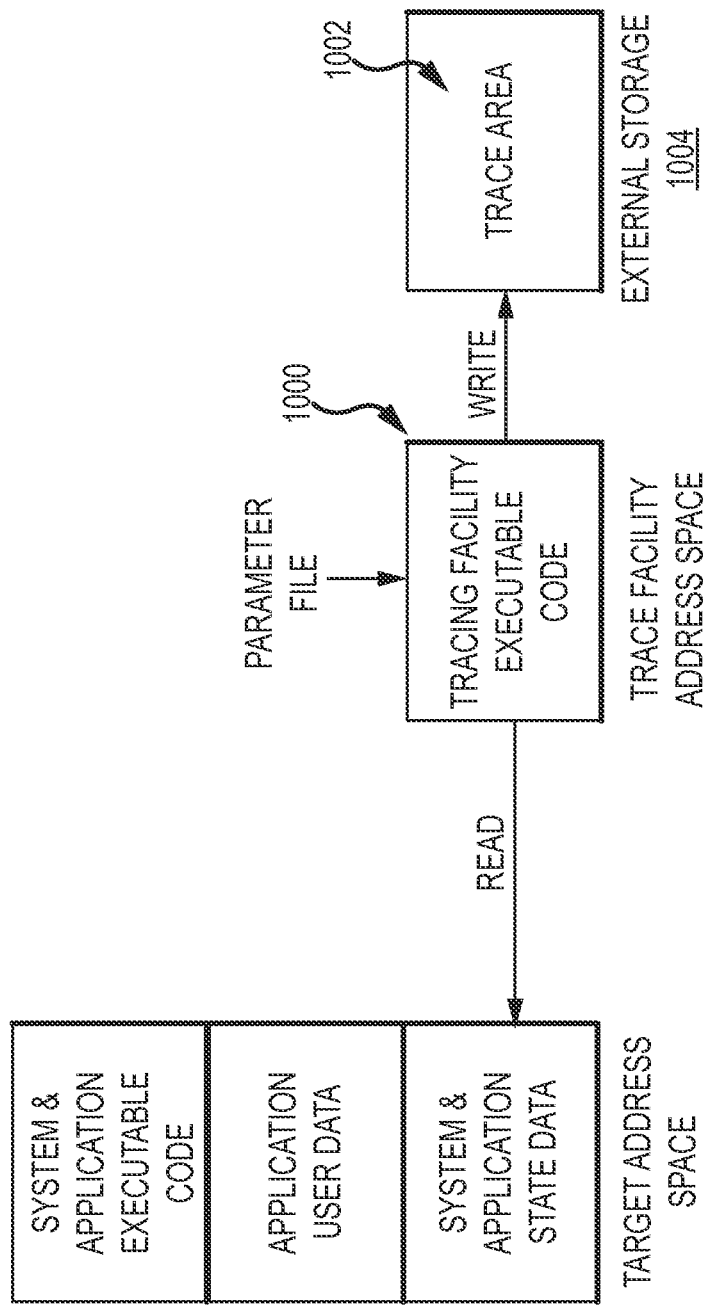
FIG. 10 depicts an embodiment in which the trace area to which the state data is written is external storage.

FIG. 10 depicts an embodiment of a trace facility 1000 in which the trace area 1002 resides in external storage 1004.

As will be appreciated by one of ordinary skill in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semi-conductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart, or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and or flowchart illustration, can be implemented by special purpose hardware-based systems that perform the specified functions or acts, or combinations of special purpose hardware and computer instructions.

The terminology used herein is for the purpose of describing particular embodiments only and is not intended to ne limiting of the invention. As used herein, the singular forms "a", "an" and "the" are intended to include the plural forms as well, unless the context clearly indicates otherwise. It will be further understood that the terms "comprises" and/or "Comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable other of ordinary skill in the art to understand the invention for various embodiments with various modifications as are suited to the particular use contemplated.

What is claimed is:

1. A method for obtaining a real-time trace of state data from a processing task in which the operating system and central processing units (CPUs) support a cross-memory mode, comprising:
   providing a processing task comprising executable code, user data and state data in a target address space in memory;
   providing a trace area;
   providing a time-based trace facility comprising executable code in a trace address space in memory, said target address space and said trace address space being different address spaces;
   providing a clocking signal;
   providing a parameter file comprising a user-specified time interval and user-specified state data; and
   allocating different time slices of CPU resources to the target address space to run the processing task executable code at a system time interval to update the state data and to the trace address space to trigger the trace facility executable code at the user-specified time interval using the cross-memory mode to read the user-specified state data from the target address space and to write the user-specified state data to the trace area to store a historical record of state data at multiple time instances, said time slices of CPU resources allocated to the trace address space according to the trace facility's time-based schedule to trigger the trace facility executable code at the user-specified time interval asynchronous to the running of the processing task at the system time interval.

2. The method of claim 1,
   wherein the parameter file further specifies at least a target address space, a processing task within the target address space, and a trace facility module selected from a plurality of trace facility modules, said trace facility reading the user-specified state data for the processing task from the target address space specified in the parameter file.

3. The method of claim 1, wherein the one or more CPUs allocate different time slices to the trace address space at a different user-specified time interval according to the user-specified time interval to trigger the trace facility.

4. A system for obtaining a real-time trace of state data from a processing task in which the operating system and central processing units (CPUs) support a cross-memory mode, comprising:
   memory;
   one or more target address spaces in said memory;
   one or more processing tasks comprising executable code, user data and state data in said one or more target address spaces, respectively;
   one or more CPUs, said one or more CPUs allocating a sequence of time slices of CPU resources to the one or more target address spaces to run the processing task executable codes to update the state data in the respective target address spaces, each said processing task running at each successive time slice until the time slice ends, is interrupted or the task voluntary gives up control;
   a trace area;
   a trace address space in said memory, said one or more target address spaces and said trace address space being different address spaces;
   a parameter file comprising a user-specified time interval and user-specified state data;
   a clocking signal; and
   a time-based trace facility assigned to trace one said processing task, said time-based trace facility comprising executable code in the trace address space, said trace facility requesting allocation of a different time slice of CPU resources to the trace address space to trigger the trace facility at the user-specified time interval based on the clocking signal using the cross-memory mode to read the user-specified state data from the target address space of the assigned processing task and to write the state data to the trace address area to store a historical record of state data at multiple time instances, said triggering of the trace facility at the user-specified time interval being asynchronous to the running of the assigned processing task.

5. The system of claim 4, wherein the operating system is z/OS.

6. The system of claim 4, wherein the cross-memory mode is one of an Access Register (AR) mode and a primary and secondary cross-memory mode.

7. The system of claim 4, wherein the parameter file further specifies at least a target address space, a processing task within the target address space, and a trace facility module selected from a plurality of trace facility modules.

8. The system of claim 4, wherein the one or more CPUs allocate time slices to the target address space at a system time interval to run the processing tasks, said system time interval being different than the user-specified time interval, wherein the one or more CPUs allocate different time slices to the trace address space at the different user-specified time interval to run the trace facility.

9. The system of claim 4, wherein said one or more CPUs allocate time slices 1, 2, . . . M of CPU resources to one or more target address spaces in sequence to run one or more processing tasks, each said processing task running at each successive time slice until the time slice ends, is interrupted or the task voluntarily gives up control, said one or more CPUs allocating a different time slice N according to the trace facility's user-specified time interval to the trace address space to run the trace facility.

10. The system of claim 4, wherein said user-specified time interval requests allocation of a different time slice of CPU resources to the trace address space, said frequency of time slices 1, 2, . . . M being sufficient high that time slice N is at or very close to the user-specified time interval.

11. The system of claim 4, wherein the trace facility does not interfere with the run-time behavior, performance or CPU or memory usage of the assigned processing task.

12. The system of claim 4, wherein the trace area resides in the target address space.

13. The system of claim 4, wherein if an error occurs during execution of the processing task, said CPU resources execute a memory dump to permanent storage saving a snap-shot of the entire target address space including the trace area.

14. A computer program product stored in a non-transitory computer readable medium for obtaining a real-time trace of state data from a processing task comprising executable code, user data and state data in a target address space in memory in which the operating system and central processing units (CPUs) support a cross-memory mode and said CPUs allocate time slices of CPU resources to different target address spaces at a system time interval to execute instructions in those target address spaces and run the processing task executable code to update the state data, the computer program product comprising a computer-readable storage medium having computer-readable program code portions stored therein for download to a different trace address space in said memory, the computer-readable program code portions comprising:

a first executable portion that implements a time-based trace facility using the cross-memory mode to request allocation of time slices for the trace address space according to a user-specified time-interval to read user-specified state data from the target address spaces and write the user-specified state data to a trace area on the user-specified time-interval to store a historical record of state data at multiple time instances, said triggering of the trace facility according to the user-specified time-interval being asynchronous to the running of the processing task at the system time interval; and a second executable portion that processes a parameter file to configure the trace facility to read state data from the target address space and write the state data to the trace area, wherein the parameter file specifies at least the user-specified state data and the user-specified time interval.

15. The computer program product of claim 14, wherein the operating system is z/OS.

16. The computer program product of claim 14, wherein the parameter file further specifies a target address space, a processing task within the target address space, and a trace facility module selected from a plurality of trace facility modules.

17. The computer program product of claim 14, wherein the one or more CPUs allocate different time slices to the trace address space at the different user-specified time interval to run the trace facility.

* * * * *